No. 774,424. PATENTED NOV. 8, 1904.
W. A. HENDERSON.
CASTER WHEEL.
APPLICATION FILED NOV. 6, 1903.
NO MODEL.
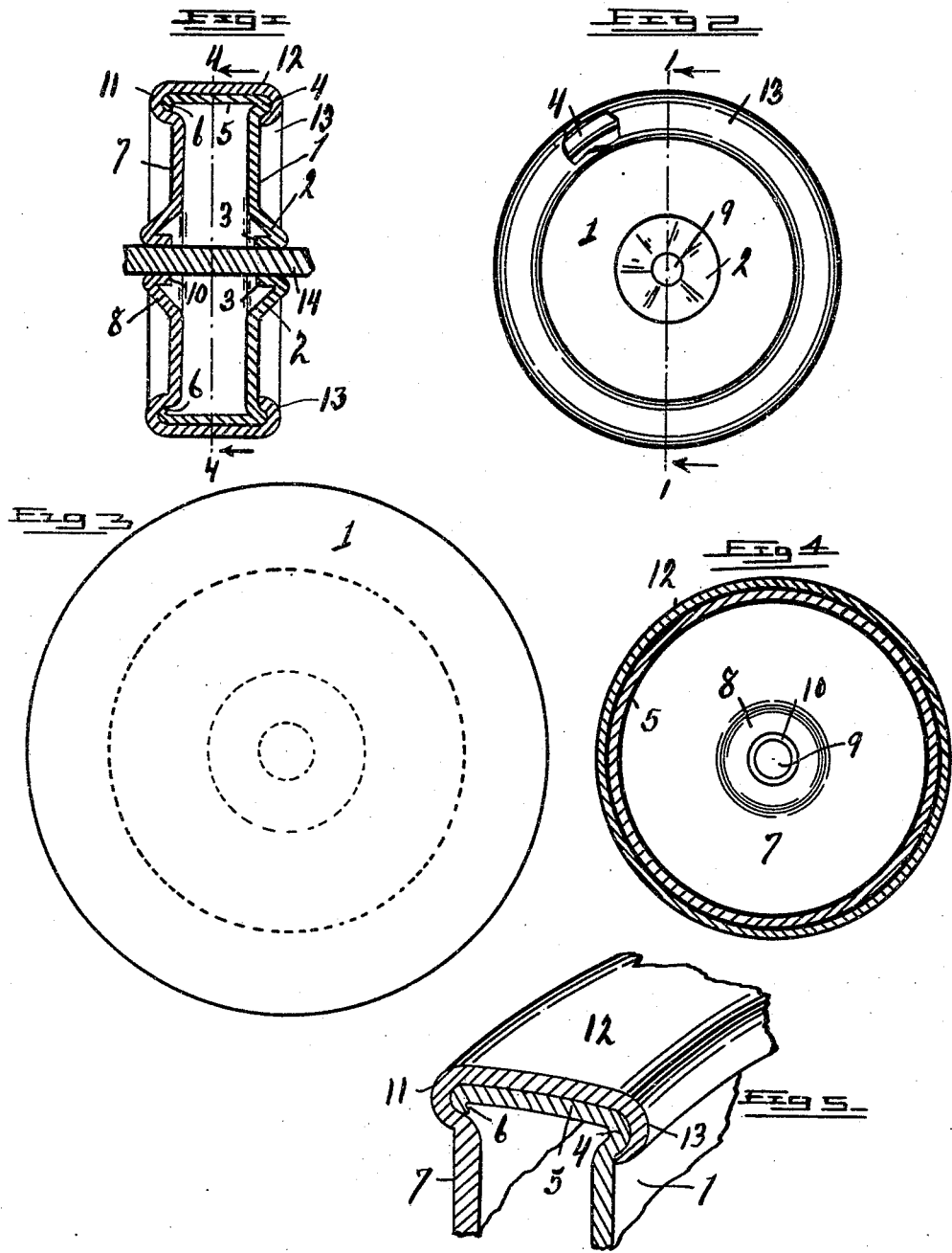

No. 774,424. Patented November 8, 1904.

UNITED STATES PATENT OFFICE.

WILLIAM A. HENDERSON, OF DETROIT, MICHIGAN.

CASTER-WHEEL.

SPECIFICATION forming part of Letters Patent No. 774,424, dated November 8, 1904.

Application filed November 6, 1903. Serial No. 180,041. (No model.)

*To all whom it may concern:*

Be it known that I, WILLIAM A. HENDERSON, a citizen of the United States, residing at Detroit, in the county of Wayne, State of Michigan, have invented certain new and useful Improvements in Caster-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a caster-wheel; and it consists in the construction and arrangement of parts hereinafter fully set forth, and pointed out particularly in the claim.

The object of the invention is to provide a caster-wheel of two parts so shaped as to fit one within the other and form a strong wheel from steel stampings having a tread free from seams or projections.

The above object is attained by the structure illustrated in the accompanying drawings, in which—

Figure 1 is a diametrical section through the wheel and a longitudinal section through the axle. Fig. 2 is an elevation of the wheel, a portion of the rim being broken away. Fig. 3 is a blank from which one side of the wheel is formed. Fig. 4 is a circumferential section as on line 4 4 of Fig. 1. Fig. 5 is a fragmentary view in perspective of a portion of the rim of the wheel.

Referring to the characters of reference, 1 designates the disk forming the web of one side of the wheel, which is so stamped or shaped as to form the protruding hub portion 2, having the horizontal bearing-face 3 surrounding the axle-opening 9 and which at the perimeter is provided with a rolled annular bead 4. The peripheral portion 5 of the disk is integral with the web and is provided with a rolled edge 6. The opposite side of the wheel is formed by the disk 7, which is stamped in like manner to produce the protruding hub 8, having the bearing-face 10 around the axle-opening and the annular bead 11, which embraces the rolled margins 6 of the peripheral portion of the opposite disk. The peripheral portion 12 of the disk 7 embraces the corresponding portion of disk 1, and its marginal edge is rolled, as at 13, to embrace the bead 4 of said first-mentioned disk, thereby forming the tread of the caster of double thickness, composed of the interlocking members lying one upon the other, while the web of the caster is composed of opposed walls standing approximately parallel, producing a caster adapted to stand great lateral strain. By this peculiar structure a caster is formed of two pieces which are so united as to present the appearance of a solid wheel whose periphery is free from seams or ridges likely to injure the surface upon which the wheel is standing.

The turning of the roll on the margin of the disk 7, which embraces the bead 4 of the disk 1, is accomplished after the parts have been placed together, whereby the wheel when finished is caused to present a solid appearance and the parts thereof are firmly united.

By forming the bearing-flanges 3 and 10 around the axle-opening 9 a firm support is provided for the axle 14.

Having thus fully set forth my invention, what I claim as new, and desire to secure by Letters Patent, is—

A wheel composed of two opposed disks having integral peripheral portions which lie contiguous, the peripheral portion of one disk having at one margin a rolled bead where it joins the web, and at the other margin a rolled edge, the peripheral portion of the other disk having an annular bead which embraces the rolled margin of the first-mentioned peripheral portion, and having a rolled margin which embraces the bead of the first-mentioned disk.

In testimony whereof I sign this specification in the presence of two witnesses.

WILLIAM A. HENDERSON.

Witnesses:
E. S. WHEELER,
I. G. HOWLETT.